Nov. 15, 1960 D. F. RODGERS 2,959,872
EDUCATIONAL DEVICE
Filed Oct. 6, 1958 2 Sheets-Sheet 1

INVENTOR.
DOROTHY F. RODGERS
BY Pennie Edmonds Morton, Barrows & Taylor
ATTORNEYS Nov. 15, 1960　　　D. F. RODGERS　　　2,959,872
EDUCATIONAL DEVICE
Filed Oct. 6, 1958　　　　　　　　　　　2 Sheets-Sheet 2

INVENTOR
DOROTHY F. RODGERS
BY
ATTORNEYS

United States Patent Office 2,959,872
Patented Nov. 15, 1960

2,959,872

EDUCATIONAL DEVICE

Dorothy F. Rodgers, 70 E. 71st St., New York, N.Y.

Filed Oct. 6, 1958, Ser. No. 765,623

3 Claims. (Cl. 35—74)

This invention relates to an educational device. More particularly it relates to a device by which a child or other person may, with one form of the device, create a simple story or, with other forms of the device, learn the alphabet, the meaning of words or to spell, learn to solve problems in arithmetic, puzzles, riddles and the like, and perform a variety of other educational tasks.

My new educational device comprises a plurality of multi-layer leaves, e.g., envelope-type, hingably connected together along one edge of each leaf, the leaves advantageously being mounted in a binder having outer hard covers extending over the outermost surface of the endmost leaves of the device. Each leaf of the device comprises two outer layers of sheet material and at least one inner rotatable disk of sheet material disposed between the two outer layers of sheet material. The rotatable disk is pivotally mounted on at least one of the outer layers of the leaf and means are provided for rotating this disk. The outer surface of at least one of the outer layers of the leaf and the adjacent surface of the rotatable disk of the leaf each have a mutually complementary design thereon. The last-mentioned outer layer of the leaf is formed with at least one cutout opening positioned with relation to the design thereon and with relation to the design on the rotatable disk disposed between the two outer layers of the leaf so that a meaningful combination of the two designs can be created by rotation of the rotatable disk. Furthermore, the design on each of the leaves of the device may have a meaningful relationship to the designs on the adjoining leaves of the device.

The educational device of my invention will be better understood from the following description in conjunction with the accompanying drawing of which Fig. 1 is a perspective view of one form of my device the leaves of which are permanently mounted in a binder having outer hard covers;

Figure 1:
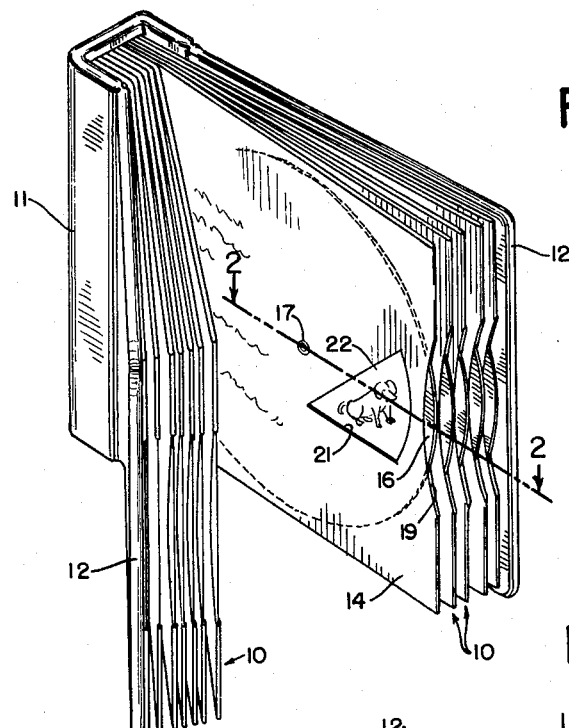
Figure 2:
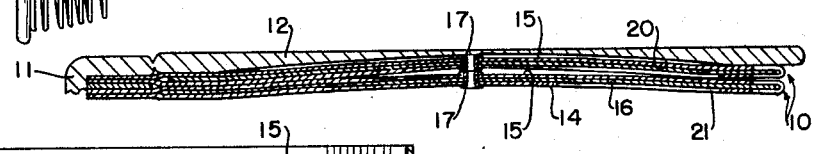
Fig. 2 is a section along the line 2—2 of Fig. 1 showing the depression advantageously formed in the inner surface of the hard covers and adapted to accommodate the bulged center portions of the leaves of the device.

The form of my educational device shown in Fig. 1 comprises a plurality of envelope-type multi-layer leaves 10 hingedly mounted along one edge of each leaf in a binder 11 having hard covers 12 adapted to cover or extend over the endmost leaves 10 when the binder is in its closed position. Each of the leaves 10 comprises two outer layers 14 and 15 of a sheet material such as paper, paperboard, cardboard, plastic or the like, and an inner rotatable disk 16 of an equivalent sheet material mounted by means of a pivot 17 between the outer layers 14 and 15 of the leaf 10. Means are provided for rotating the disk 16 such as, for example, the concave cutout portion 19 of one edge of the outer layers of the leaf 10 which, in turn, exposes a portion of the rotatable disk 16 by which the disk can be manually turned or rotated. The thickness of each leaf 10 near the center thereof where the pivot 17 extends through the leaf is appreciably thicker than the peripheral portions of the leaf, and as a consequence the center portions of the plurality of leaves 10 tend to bulge outwardly somewhat as shown in Fig. 2 when bound together in a binder. To accommodate the outward bulge of the center of the leaves, the inner surface of each of the hard covers 12 of the binder 11 is advantageously formed with a depressed portion 20 aadapted to receive the bulge created by the pivots 17 extending through the several leaves of the device as shown in Fig. 2.

The surface of the outer layer 14 and the adjacent surface of the inner disk 16 are provided with mutually complementary ornamental designs, and an opening or cutout portion 21 is formed in the ornamental layer 14 so that a portion 22 of the ornamental surface of the disk 16 is exposed to view. The mutually complementary ornamental designs on the surface of the layer 14 and on the adjacent surface of the disk 16 are such that, when the disk 16 is rotated, a meaningful combination of the two designs can be created. For example, the surface of the outer layer 14 could be decorated with a rural scene, and the rotatable disk 16 could be decorated with pictures of a variety of the animals which might be found in such a rural setting. Rotation of the disk 16 to bring the picture 22 of one of the animals (for example, the dog shown in Fig. 1) into view under the opening 21 would create a meaningful picture by the combination of the design on the layer 14 (i.e., the rural scene) and the design on the disk 16 (i.e., the dog).

Figure 3:
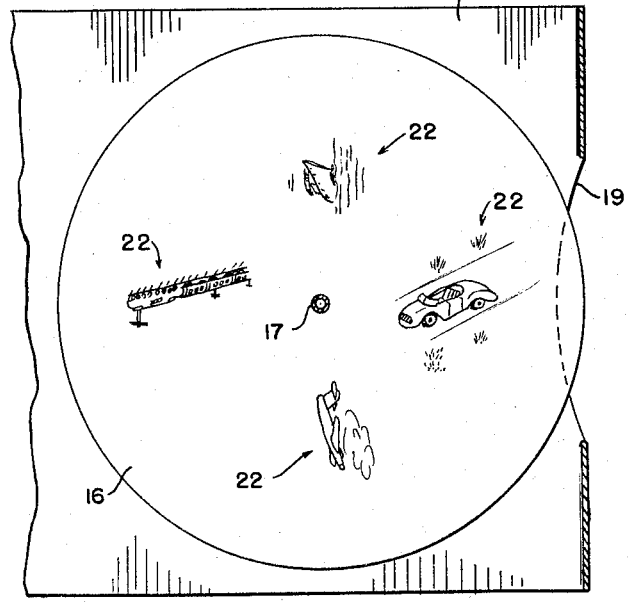
Fig. 3 is a cutaway view of one leaf of the device showing one form of ornamental design that might appear on the rotatable disk of the leaf.

In addition to the complementary relationship between the design on the surface of the outer layer 14 and the rotatable disk 16 of any one leaf 10, there exists a meaningful relationship between the designs, or combination of designs, on adjoining leaves of my educational device. For example, assuming that the form of educational device under consideration is designed to permit or encourage a child to create a simple story, the first leaf 10 of the device might be concerned with the participants in the story (e.g. a boy and a girl, a parent and child, an animal, and so on), the second or some subsequent leaf 10 might be concerned with a trip that the participants take (e.g. by automobile, airplane, train or boat, as shown on the disk 16 in Fig. 3 of the drawing), and the third or some subsequent leaf 10 might be concerned with some event or scene experienced by the participants on their trip or later on in the story (e.g., the rural scene referred to in the description of Fig. 1 of the drawing). Moreover, the device shown in Figs. 1, 2 and 3 can be readily modified so that the surfaces of both outer layers 14 and 15 of each leaf are decorated or ornamented with an appropriate design. Furthermore, both surfaces of each rotatable disk 16 can be ornamented and both outer layers 14 and 15 of the leaf can be formed with an appropriately positioned cutout portion or opening 21 so that, by suitable rotation of the disk 16, a meaningful combination of designs can be created on both sides or pages of the leaf 10. In addition, of course, one or both outer layers might be provided with a plurality of openings therein for exposure of a number of design areas of the disk.

Figure 4:
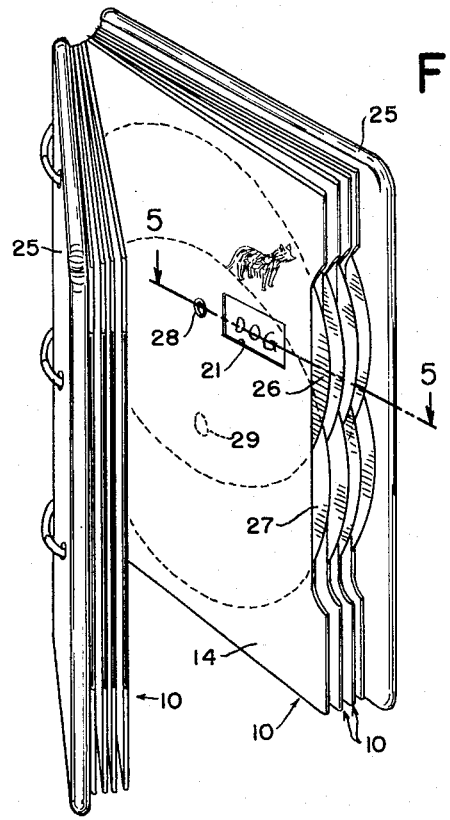
Fig. 4 is a perspective view of another form of my device in which the leaves are mounted in a loose-leaf ring binder and in which each leaf is provided with two rotatable disks.
Figure 5:
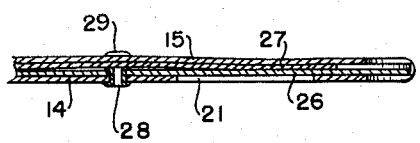
Fig. 5 is a section along the lines 5—5 of Fig. 4 showing details of construction of the leaf.
Figure 6:
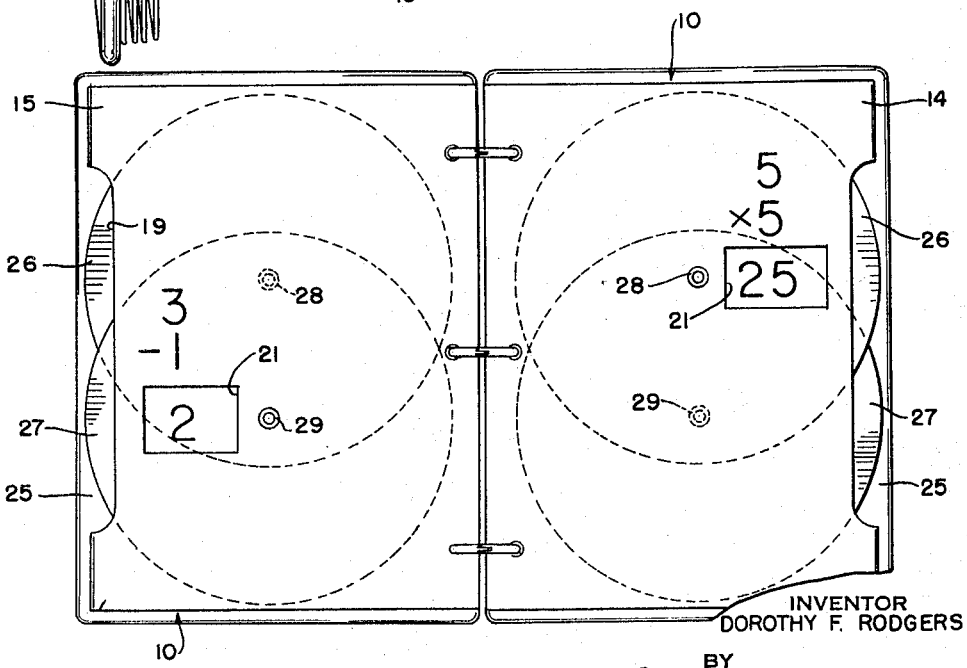
Fig. 6 is a plan view of the device shown in Fig. 4 with the device in its fully open position.

In the modification of the device shown in Fig. 4 the leaves 10 are mounted in a loose-leaf ring binder 25 so that the educational device can be easily opened up and laid out on a flat surface as shown best in Fig. 6 of the drawing. Moreover, in the device of Fig. 4 each of the leaves 10 is provided with two inner rotatable disks 26 and 27 that can be rotated independently of one another. The disks advantageously overlap one another as shown in Figs. 4, 5 and 6 with one of the two disks, say disk 26, being pivotally mounted by pivot 28 on the outer layer 14 and the other disk 27 being pivotally mounted by pivot 29 in the outer layer 15 of the leaf. The surfaces of both outer layers 14 and 15 of the leaf 10 and the surfaces of the disks 26 and 27 adjacent thereto bear ornamental designs of the type hereinbefore referred to. That is to say, the ornamental design on the surface of the outer layer 14 has a meaningful and complementary relationship to the design of the adjacent surface of the disk 26 so that appropriate rotation of the disk 26 will create a meaningful combination of the designs on the disk 26 and the layer 14, and the design on the surface of the outer layer 15 has a meaningful and complementary relationship to the design on the adjacent surface of the rotatable disk 27 so that appropriate rotation of the disk 27 will create a meaningful combination of the designs on the disk 27 and the layer 15. Furthermore, as previously pointed out the design, or combination of designs, on one side of the leaf 10 bears a meaningful relationship to the design, or combination of designs, on the other side of the leaf and also to the designs on adjoining leaves of my educational device. Also the outer layers may again be provided with a plurality of openings therein.

In addition to the form of the device referred to in connection with the description of Fig. 1 by which a child or other person can create an original story, my educational device can be adapted to teach young persons a variety of other skills. For example, as illustrated in Fig. 4 of the drawing, the device can be adapted to teach the alphabet, the meaning of words, the spelling of words, and other such skills, or my device can be adapted to pose simple problems in arithmetic and allied subjects that are solvable by appropriate rotation of the inner disks of the device as illustrated in Fig. 6 of the drawing. Other contemplated uses include employment of various forms of the device for diagnostic testing in psychological or psychiatric investigations, etc. Accordingly it will be seen that I have devised an important contribution to the art to which my invention relates.

I claim:

1. An educational device comprising a plurality of multi-layer leaves hingably connected together along one edge of each leaf, each leaf comprising two outer layers of sheet material and at least one inner rotatable disk of sheet material disposed between said two outer layers, said disk being pivotally mounted on at least one of said outer layers, and means for rotating said disk, the outer surface of at least one of the outer layers of the leaf and the adjacent surface of the rotatable disk of the leaf each having a mutually complementary design thereon, said last-mentioned outer layer of the leaf being formed with at least one cut-out opening positioned with relation to the design thereon and with relation to the design on the rotatable disk disposed between the two outer layers of the leaf so that a meaningful combination of the two designs can be created by rotation of the rotatable disk, the design on each of said leaves having a meaningful relationship to the designs on the adjoining leaves of the educational device.

2. An educational device comprising a plurality of envelope-type multi-layer leaves hingably connected together along one edge of each leaf, each leaf comprising two outer layers of sheet material and at least two inner rotatable disks of sheet material disposed between said two outer layers, each of said disks being pivotally mounted on at least one of said outer layers, and means for rotating said disks, the outer surface of at least one of the outer layers of the leaf and the adjacent surface of at least one of the rotatable disks of the leaf each having a mutually complementary ornamental design thereon, said ornamented outer layer of the leaf being formed with at least one cut-out opening positioned with relation to the ornamental design thereon and with relation to the ornamental design on at least one of the rotatable disks disposed between the two outer layers of the leaf so that a meaningful combination of designs can be created by rotation of the rotatable disks, the design on each of said leaves having a meaningful relationship to the designs on the adjoining leaves of the educational device.

3. An educational device comprising a plurality of envelope-type multi-layer leaves hingably mounted together along one edge of each leaf in a binder having outer hard covers of sheet material extending over the endmost leaves of the device when the binder is in its closed position, each leaf comprising two outer layers of sheet material and at least one inner rotatable disk of sheet material disposed between the two outer layers, pivot means pivotally mounting said disk on at least one of said outer layers, and means for rotating said disk, the inner surfaces of each of said hard covers being formed with a depressed portion adapted to receive the proximate portion of the pivot means of the proximate endmost leaf and the portion of said leaf immediately surrounding said pivot means that is bowed outwardly when said binder is in its closed position, the outer surface of at least one of the outer layers of the leaf and the adjacent surface of the rotatable disk of the leaf each having a mutually complementary design thereon, said last-mentioned outer layer of the leaf being formed with at least one cut-out opening positioned with relation to the design thereon and with relation to the design on the rotatable disk disposed between the two outer layers of the leaf so that a meaningful combination of the two designs can be created by rotation of the rotatable disk, the combination of designs on each of said leaves having a meaningful relationship to the designs on the adjoining leaves of the educational device.

References Cited in the file of this patent

UNITED STATES PATENTS

| 1,120,681 | Browning | Dec. 15, 1914 |
| 1,728,584 | Wright | Sept. 17, 1929 |
| 2,628,435 | Minninger et al. | Feb. 17, 1953 |
| 2,810,211 | Zesbaugh | Oct. 22, 1957 |

FOREIGN PATENTS

| 664,740 | France | Apr. 29, 1929 |
| 151,763 | Great Britain | Oct. 7, 1920 |